United States Patent
Yamaguchi et al.

(10) Patent No.: US 9,419,481 B2
(45) Date of Patent: Aug. 16, 2016

(54) ROTARY ELECTRIC MACHINE

(71) Applicant: HONDA MOTOR CO., LTD., Tokyo (JP)

(72) Inventors: Tadashi Yamaguchi, Wako (JP); Masashi Inoue, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 247 days.

(21) Appl. No.: 14/180,357

(22) Filed: Feb. 14, 2014

(65) Prior Publication Data

US 2014/0232232 A1 Aug. 21, 2014

(30) Foreign Application Priority Data

Feb. 21, 2013 (JP) ................. 2013-032130

(51) Int. Cl.
*H02K 21/12* (2006.01)
*H02K 1/27* (2006.01)

(52) U.S. Cl.
CPC .................... *H02K 1/2766* (2013.01)

(58) Field of Classification Search
CPC ............... H02K 1/2766; H02K 1/27
USPC ............ 310/156.53, 156.56, 156.57
See application file for complete search history.

(56) References Cited

U.S. PATENT DOCUMENTS 7,504,754 B2* 3/2009 Jahns ............ H02K 1/2766
310/156.53
7,843,101 B2* 11/2010 Ito ............... H02K 1/2766
310/156.46
8,957,560 B2* 2/2015 Uchiyama ........ H02K 1/2766
310/156.56
2009/0026867 A1* 1/2009 Haruno .......... H02K 1/2766
310/156.21
2010/0213781 A1* 8/2010 Rahman ......... H02K 1/2766
310/156.56
2012/0091848 A1* 4/2012 Sakai ............. H02K 1/2766
310/156.43

FOREIGN PATENT DOCUMENTS

CN 102217170 10/2011
WO WO 2011/001533 1/2011

OTHER PUBLICATIONS

Chinese Office Action for corresponding CN Application No. 201410054321.X, Dec. 4, 2015.

* cited by examiner

*Primary Examiner* — Hanh Nguyen
(74) *Attorney, Agent, or Firm* — Mori & Ward, LLP

(57) ABSTRACT

A rotary electric machine includes a rotor, and a stator. The rotor includes poles having slots and magnets. Each of the slots includes a first housing hole, a pair of second housing holes, a pair of first ribs, a pair of second ribs, and an area of a first space. The first housing hole is disposed near an outer periphery of the rotor to be substantially parallel with an outer peripheral surface of the rotor. The pair of second housing holes are provided symmetrically with respect to the first housing hole to be inclined toward the outer periphery away from the first housing hole. The pair of first ribs are each provided between the first housing hole and each of the pair of second housing holes. The pair of first ribs are each provided between the first housing hole and each of the pair of second housing holes.

9 Claims, 3 Drawing Sheets

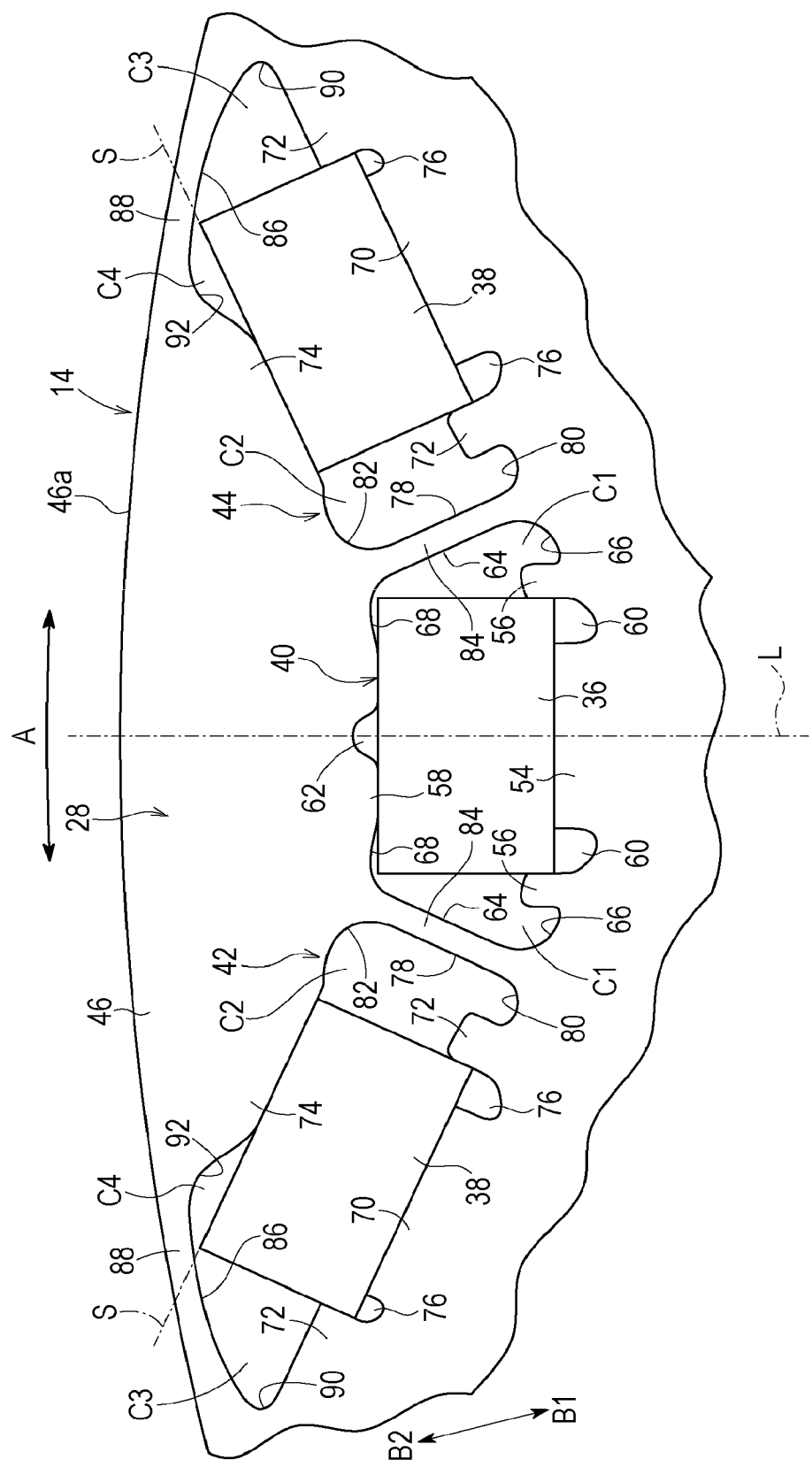

ROTARY ELECTRIC MACHINE

CROSS-REFERENCE TO RELATED APPLICATIONS

The present application claims priority under 35 U.S.C. §119 to Japanese Patent Application No. 2013-032130, filed Feb. 21, 2013, entitled "Rotary Electric Machine." The contents of this application are incorporated herein by reference in their entirety.

BACKGROUND

1. Field

The present application relates to rotary electric machine.

2. Description of the Related Art

A known rotary electric machine includes a ring-shaped stator and a rotor placed in a center portion of the stator so as to be rotatable and housing permanent magnets near the outer periphery of the rotor, and generates a revolving magnetic field by means of coils that are wound around slots of the stator so as to rotate the rotor. To increase power, a rotary electric machine in which leakage of a magnetic flux between adjacent magnets can be reduced by reducing generation of stress due to a centrifugal force generated by high-speed rotation of the rotor has been employed in recent years.

In this type of rotary electric machine, as described in International Publication No. 2011/001533, for example, a rotor has three adjacent magnet insertion holes, including a first magnet insertion hole and a pair of second magnet insertion holes located at the two ends of the first magnet insertion hole, and a permanent magnet is inserted in each of the holes. The first and second magnet insertion holes are disposed so as to form a shape that is approximately U shaped and is open toward the outer periphery of the rotor, and the first magnet insertion hole and each of the second magnet insertion holes have a bridge having a predetermined width interposed therebetween.

SUMMARY

According to one aspect of the present invention, a rotary electric machine includes a rotor and a stator. The rotor has a rotational axis around which the rotor is to be rotated. The rotor includes poles and magnets. The poles have slots, respectively. The magnets are provided in the slots. Each of the slots includes a first housing hole, a pair of second housing holes, a pair of first ribs, a pair of second ribs, and an area of a first space between each of the magnets and the first rib in each of the first and second housing holes. The first housing hole is disposed near an outer periphery of the rotor to be substantially parallel with an outer peripheral surface of the rotor. The pair of second housing holes are provided symmetrically with respect to the first housing hole to be inclined toward the outer periphery away from the first housing hole. The pair of first ribs are each provided between the first housing hole and each of the pair of second housing holes. The pair of second ribs are each provided between each of the pair of second housing holes and the outer peripheral surface of the rotor. The area of the first space is larger than an area of a second space between each of the magnets and an adjacent one of the pair of second ribs in each of the pair of second housing holes. The stator has a center axis and is provided to surround the rotor such that the rotational axis of the rotor substantially coincides with the center axis of the stator.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIG. 3 is an enlarged plan view illustrating a portion of the rotor of FIG. 2 including first through third housing holes.

DESCRIPTION OF THE EMBODIMENTS

Figure 1:
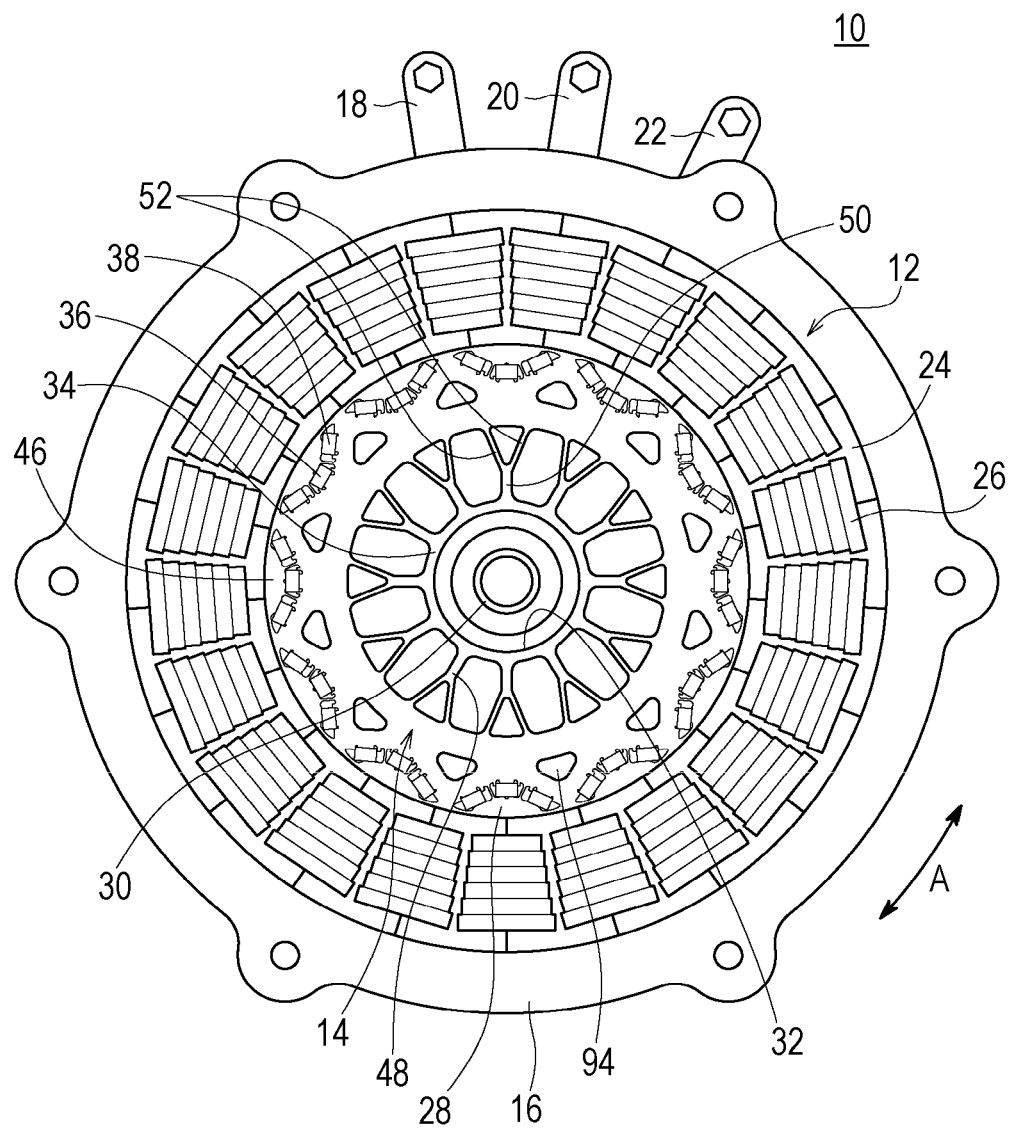
FIG. 1 is an overall plan view illustrating a rotary electric machine according to an embodiment of the present application.

The embodiments will now be described with reference to the accompanying drawings, wherein like reference numerals designate corresponding or identical elements throughout the various drawings.

A preferred embodiment of a rotary electric machine of the present application will be specifically described with reference to the attached drawings. In FIG. 1, reference numeral 10 denotes a rotary electric machine according to an embodiment of the present application.

The rotary electric machine 10 is, for example, a 3-phase alternating current (AC) brushless motor, and includes a ring-shaped stator 12, a rotor 14 penetrating the center of the stator 12, and a ring-shaped housing 16 located around the outer periphery of the stator 12 and holding the stator 12, as illustrated in FIG. 1. In the rotary electric machine 10, the rotor 14 rotates under electric power supplied from a power supply (not shown) through a U-phase terminal 18, a V-phase terminal 20, and a W-phase terminal 22.

The stator 12 includes split cores that are arranged circumferentially (along the direction indicated by arrow A) and each include axially laminated steel plates. The stator 12 is held on, and integrated with, the housing 16 placed around the outer periphery of the stator 12 with the split cores being circumferentially joined together. The stator 12 includes a ring-shaped stator core 24 and conductors 26 placed in slots (not shown) formed in the stator core 24. The conductors 26 are connected to the U-phase terminal 18, the V-phase terminal 20, and the W-phase terminal 22. The stator core 24 illustrated in FIG. 1 may be in an integrated form, instead of combining a plurality of split cores.

Figure 2:
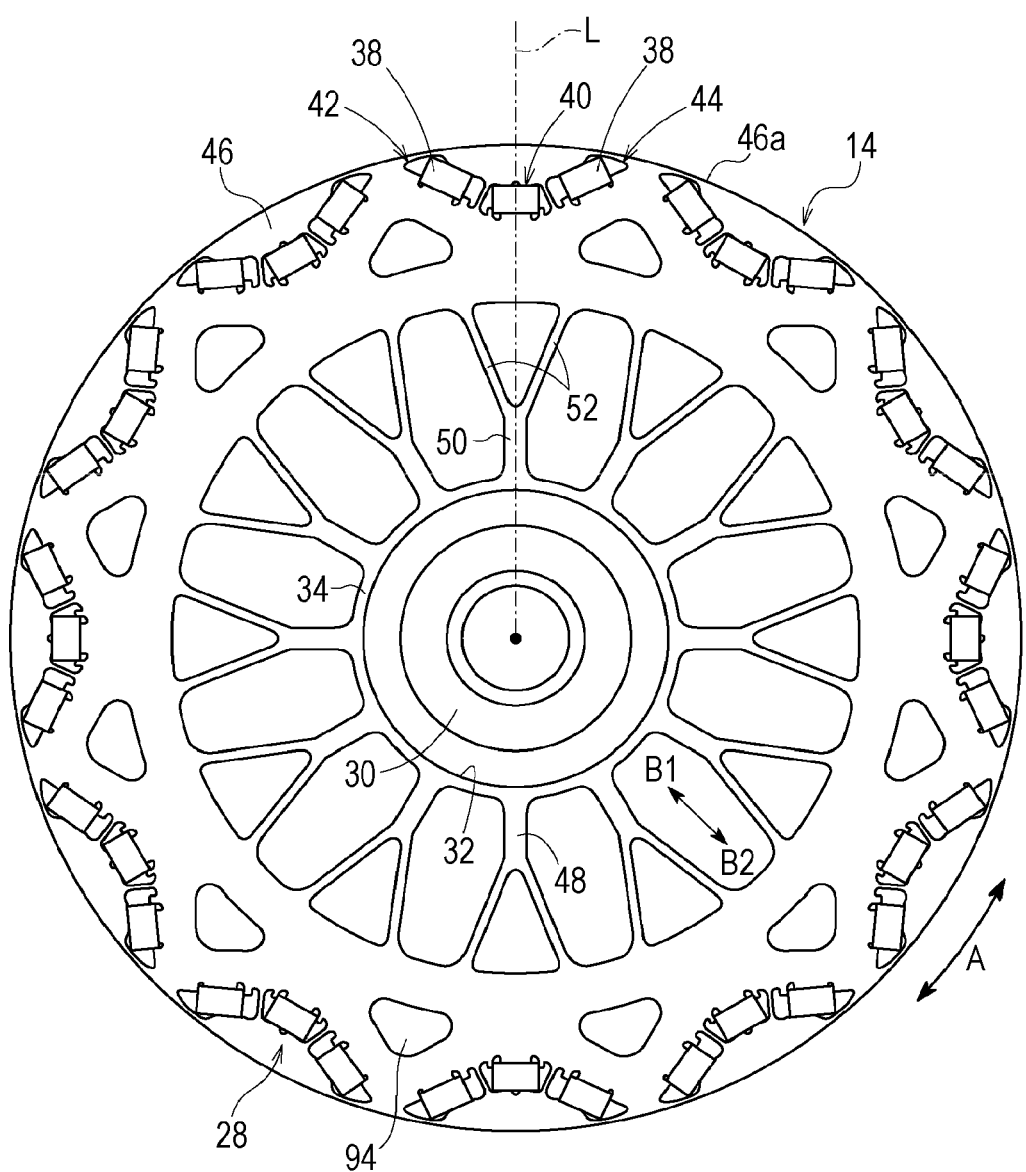
FIG. 2 is a plan view illustrating a rotor of the rotary electric machine of FIG. 1.

As illustrated in FIGS. 1 and 2, the rotor 14 includes, for example, a disc-shaped rotor body 28 and a rotating shaft 30 that is press-fitted into a center portion of the rotor body 28. The rotor body 28 is formed by, for example, axially laminating steel plates, and includes a first ring portion 34 located at the inner periphery (in the direction indicated by arrow B1 in FIGS. 2 and 3) of the rotor body 28 and having a hole 32 in which the rotating shaft 30 is inserted, a second ring portion 46 located at the outer periphery (in the direction indicated by arrow B2 in FIGS. 2 and 3) of the first ring portion 34 and having first through third housing holes 40, 42, and 44 to be equipped with first and second magnets 36 and 38, and a connection portion 48 located between the first ring portion 34 and the second ring portion 46 and connecting the first and second ring portions 34 and 46 to each other.

The first through third housing holes 40, 42, and 44 are formed at the time when the steel plates constituting the rotor body 28 are pressed.

The connection portion 48 connects the outer peripheral surface of the first ring portion 34 and the inner peripheral surface of the second ring portion 46, and includes linear ribs 50 connected to the outer peripheral surface and extending radially outward (i.e., in the direction indicated by arrow B2) and branch ribs 52 connected to outer ends of the linear ribs 50 in the radial direction (i.e., in the direction indicated by arrow B2) and each branching off into two parts toward the outer periphery (i.e., in the direction indicated by arrow B2) to be connected to the inner peripheral surface of the second ring portion 46. Multiple sets of the linear ribs 50 and the branch ribs 52 are arranged so as to be spaced at regular intervals along the circumference of the rotor body 28 (i.e., in the direction indicated by arrow A).

The first ring portion 34 has a ring shape with a substantially uniform diameter and is joined to the rotating shaft 30 by press-fitting the rotating shaft 30 into the hole 32 at the center of the first ring portion 34. In this manner, the rotor body 28 and the rotating shaft 30 constituting the rotor 14 integrally rotate.

As illustrated in FIGS. 1 to 3, the second ring portion 46 has a ring shape with a substantially uniform diameter larger than that of the first ring portion 34, and the three first through third housing holes 40, 42, and 44 forming a shape that is approximately U shaped in cross section and is open toward the outer periphery (i.e., in the direction indicated by arrow B2) are located near an outer peripheral surface 46a.

A plurality of sets (e.g., 12 sets) of the first through third housing holes 40, 42, and 44 are disposed so as to be spaced at regular intervals along the circumference of the second ring portion 46 (i.e., in the direction indicated by arrow A), and each equipped with the first and second magnets 36 and 38 in the inside thereof to function as magnetic poles. The first and second magnets 36 and 38 are, for example, permanent magnets that are rectangular in cross section, and are disposed along the longitudinal direction of the first through third housing holes 40, 42, and 44. Three first through third housing holes 40, 42, and 44 equipped with the first and second magnets 36 and 38 function as one magnetic pole. That is, the rotor 14 includes 12 magnetic poles disposed circumferentially (i.e., in the direction indicated by arrow A).

The first and second magnets 36 and 38 have an identical shape. The first magnet 36 is placed in the first housing hole 40, and the second magnets 38 and 38 are respectively placed in the second and third housing holes 42 and 44.

The first housing holes 40 have a predetermined width in the circumferential direction of the rotor 14, are approximately parallel with the outer peripheral surface 46a of the second ring portion 46, and are located outside of the linear ribs 50 of the connection portion 48. Each of the first housing holes 40 includes a first base 54 located at the inner periphery of the first housing hole 40 and designed to be in contact with the lower surface of the first magnet 36, a pair of first holders 56 located at both sides of the first base 54, and a first retainer 58 located at the outer periphery of the first housing hole 40 to face the first holders 56 and designed to be in contact with the upper surface of the first magnet 36. The first housing hole 40 also includes a pair of first recesses 60 each located between the first base 54 and an associated one of the first holders 56 and recessed toward the first ring portion 34, and a second recess 62 located at the middle of the first retainer 58 and has a semicircular shape in cross section. The first base 54 and the first retainer 58 are approximately parallel with each other.

As illustrated in FIG. 2, each of the first housing holes 40 is disposed such that a center line L extending radially outward from the center of the rotor body 28 through the linear rib 50 passes through the center of the first housing hole 40. That is, each of the first housing holes 40 is symmetric about the center line L.

As illustrated in FIG. 3, each of the first housing holes 40 also has inner walls 64 both of which extend along the width of the first housing hole 40 and each of which is tilted at a predetermined angle such that the distance to the center line L passing through the first housing hole 40 increases toward the inner periphery (i.e., in the direction indicated by arrow B1). First ribs 84, which will be described later, are provided between one of the inner walls 64 and the second housing hole 42 and between the other inner wall 64 and the third housing hole 44. That is, each of the first housing holes 40 is approximately fan shaped in cross section including, at both transverse ends thereof, the inner walls 64 whose widths gradually increase toward the inner periphery (i.e., in the direction indicated by arrow B1).

The inner walls 64 of each of the first housing holes 40 are connected to the first holders 56 at the inner peripheral sides thereof through first curved portions (recesses) 66 with predetermined radii, and are connected to the first retainer 58 at the outer peripheral sides thereof through second curved portions (recesses) 68 with predetermined radii. The first curved portions 66 are recessed relative to the first holders 56 toward the inner periphery (i.e., in the direction indicated by arrow B1). The second curved portions 68 are recessed relative to the first retainer 58 toward the outer periphery (i.e., in the direction indicated by arrow B2). The second curved portions 68 have radii of curvature larger than those of the first curved portions 66.

The first magnet 36 placed in the first housing hole 40 has its bottom surface in contact with the first base 54, the lower portions of its side surfaces held by the pair of first holders 56, and its upper surface in contact with the first retainer 58 so as to be held by the first retainer 58. In this manner, the first magnet 36 is held in the radial direction of the rotor 14 by the first base 54 and the first retainer 58 and held in the circumferential direction (i.e., the width direction) of the rotor 14 by the first holders 56 in the first housing hole 40. The first magnet 36 is placed such that the transverse center coincides with the center of the first housing hole 40 (i.e., is located on the center line L).

Each of the first housing holes 40 includes a pair of first cavities (a first space, a third subspace) C1 each of which is formed between a side surface of the first magnet 36 and an associated one of the inner walls 64. Each of the first cavities C1 is surrounded by the side surface of the first magnet 36, the inner wall 64, the first and second curved portions 66 and 68, the first retainer 58, and the first holder 56. When viewed along the axis of the rotor 14, the first cavity C1 located near the second housing hole 42, and the first cavity C1 located near the third housing hole 44 have an identical area.

The second and third housing holes 42 and 44 have an identical shape, are symmetric about the first housing hole 40, and are each tilted at a predetermined angle relative to the first housing hole 40 such that an end of each of the second and third housing holes 42 and 44 facing the first housing hole 40 is located at an inner peripheral side (i.e., in the direction indicated by arrow B1) and the opposite end of each of the second and third housing holes 42 and 44 is located at an outer peripheral side (i.e., in the direction indicated by arrow B2).

Each of the second and third housing holes 42 and 44 includes a second base 70 located at the inner periphery thereof and configured to be in contact with the second magnet 38, a pair of second holders 72 located at both sides of the second base 70, and a second retainer 74 located at the outer periphery thereof facing the second holders 72 and configured to be in contact with the upper surface of the second magnet 38.

The second base 70 and the second retainer 74 are approximately parallel with each other. The second retainer 74 is offset to the first housing hole 40 with respect to the second base 70 by a predetermined distance. The second housing hole 42 includes a pair of third recesses 76 each located between the second base 70 and associated one of the second holders 72 and recessed toward the first ring portion 34.

In each of the second and third housing holes 42 and 44, lower portions of both side surfaces of the second magnet 38 are held by the pair of second holders 72 with the bottom surface of the second magnet 38 being in contact with the second base 70 and the upper surface of the second magnet 38 being in contact with the second retainer 74. That is, in each of the second and third housing holes 42 and 44, the second magnet 38 is held by the second base 70 and the second retainer 74 in the radial direction of the rotor 14 and is also held by the second holders 72 in the circumferential direction (the width direction) of the rotor 14.

On each of the inner peripheries of the second and third housing holes 42 and 44, an inner wall 78 close to the first housing hole 40 extends in the width direction to be approximately perpendicular to the second base 70 and the second retainer 74. The inner wall 78 is connected to the second holder 72 via a third curved portion (a recess) 80 with a predetermined radius at the inner peripheral end of the inner wall 78, while being connected to the second retainer 74 via a fourth curved portion (a recess) 82 with a predetermined radius at the outer peripheral end of the inner wall 78. The third curved portion 80 is recessed toward the inner periphery relative to the second holder 72. The fourth curved portion 82 is recessed toward the outer periphery relative to the second retainer 74. The fourth curved portion 82 has a radius of curvature larger than that of the third curved portion 80.

The first ribs 84 having an approximately identical width are formed such that each of the first ribs 84 is sandwiched between one of the inner walls 78 of the second and third housing holes 42 and 44 and an associated one of the inner walls 64 of the first housing hole 40. The first ribs 84 are approximately parallel with, and are spaced at regular intervals from, the side surfaces of the second magnet 38 placed in the second and third housing holes 42 and 44. The second magnet 38 and each of the first ribs 84 sandwich a second cavity (a first space, a fourth subspace) C2.

The second cavity C2 is surrounded by a side surface of the second magnet 38, the first ribs 84, the second and third curved portions 80 and 82, the second retainer 74, and the second holders 72 in each of the second and third housing holes 42 and 44.

On the other hand, in each of the second and third housing holes 42 and 44, the inner wall 86 at the outer periphery opposite to the first housing hole 40 is approximately parallel with the outer peripheral surface 46*a* of the second ring portion 46, and a second rib 88 having an approximately uniform width is formed between the inner wall 86 and the outer peripheral surface 46*a*. The inner wall 86 has an arc shape in cross section to have its width gradually increase from the second retainer 74 toward the second holder 72. The inner wall 86 is connected to the second holder 72 via a fifth curved portion 90. The inner wall 86 is connected to the second retainer 74 via a sixth curved portion 92.

The fifth curved portion 90 has a relatively small radius of curvature because the inner wall 86 and the second holder 72 intersect at an acute angle. The sixth curved portion 92 has a radius of curvature larger than that of the fifth curved portion 90 because the inner wall 86 and the second retainer 74 intersect at a relatively large angle. The sixth curved portion 92 is recessed toward the outer periphery relative to the second retainer 74, and is spaced from the upper surface and corners of the second magnet 38 by predetermined intervals.

In each of the second and third housing holes 42 and 44, a third space (a second space, a second subspace) C3 surrounded by the second holder 72, the inner wall 86, the fifth curved portion 90, the side surface of the second magnet 38, and a virtual line S extending from the upper surface of the second magnet 38 to the inner wall 86 is formed.

In each of the second and third housing holes 42 and 44, a fourth cavity (a second space, a first subspace) C4 surrounded by the upper surface of the a second magnet 38, a virtual line S extending from the upper surface of the second magnet 38 to the inner wall 86, and the sixth curved portion 92 is formed. The fourth cavity C4 has an approximately semicircular shape in cross section, and is connected to, and communicates with, the third cavity C3 at the outer peripheral end thereof.

A melted magnet fixing material is poured into the first through fourth cavities C1, C2, C3, and C4 and the first through third recesses 60, 62, and 76 and solidified, with the first and second magnets 36 and 38 being placed in the first through third housing holes 40, 42, and 44, thereby fixing the first and second magnets 36 and 38.

As illustrated in FIGS. 1 and 2, the second ring portion 46 has a plurality of lightening holes 94 penetrating the second ring portion 46 in the axial direction and each located between the third housing hole 44 of a magnetic pole and the second housing hole 42 of its adjacent magnetic pole.

The rotary electric machine 10 of the embodiment of the present application basically has the above-described configuration. Operation and advantages of the rotary electric machine 10 will now be described.

First, power is supplied from a power supply (not shown) to the U-phase terminal 18, the V-phase terminal 20, and the W-phase terminal 22 to energize the conductors 26. Then, the conductors 26 are excited to produce a revolving magnetic field, and thereby, the rotor 14 equipped with the first and second magnets 36 and 38 serving as magnetic poles rotates in the stator 12.

In this state, the rotor 14 is supplied with a centrifugal force radially outward (i.e., in the direction indicated by arrow B2) from the rotating shaft 30 press-fitted into the center of the rotor 14. A strong centrifugal force is applied to an outer peripheral part of the second ring portion 46 which is located at the outer periphery of the rotor body 28 and in which the first and second magnets 36 and 38 having large weights are provided.

For example, in a case where the rotor 14 rotates at a higher speed or the outside diameter of the rotor 14 is increased to enhance power, the presence of the pair of first ribs 84 extending orthogonally to the longitudinal direction of the second and third housing holes 42 and 44 and located between the second and third housing holes 42 and 44 symmetric about the first housing hole 40 in the rotor 14, increases the rigidity of the second rib 88, and thus, reduces stress near the second rib 88 caused by the centrifugal force. This configuration obtains a desired strength against a centrifugal force applied to the second ring portion 46, thereby enabling a further increase in power (e.g., increase in rotational speed and diameter).

In the first through third housing holes 40, 42, and 44, the longitudinal lengths of the first ribs 84 facing the first through fourth curved portions 82 can be increased by providing the first through fourth curved portions 66, 68, 80, and 82 at the ends of the inner walls 64 and 78. The increased longitudinal lengths of the first ribs 84 can reduce the width thereof, and thus, occurrence of a short circuit of a magnetic flux between adjacent ones of the first and second magnets 36 and 38 can be reduced. As a result, it is possible to prevent a rotational torque of the rotor 14 from decreasing due to the short circuit.

As described above, in this embodiment, in the rotor body 28 of the rotor 14, the first through third housing holes 40, 42, and 44 forming a shape that is approximately U shaped in cross section are formed near the outer peripheral surface 46*a* of the second ring portion 46, and the first and second magnets 36 and 38 having the same shape are placed in the first through third housing holes 40, 42, and 44. In the first housing hole 40 and the second and third housing holes 42 and 44, when viewed along the axis of the rotor 14, the total area of adjacent ones of the first and second cavities C1 and C2 is larger than the total area of the third and fourth cavities C3 and C4 provided at the outer peripheral sides of the second and third housing holes 42 and 44.

Thus, in the second and third housing holes 42 and 44, the second magnet 38 is disposed close to the outer peripheral surface 46a of the rotor body 28, so that the second magnet 38 can approach the teeth (not shown) of the stator 12 located at the outer periphery of the rotor 14, and the rotational torque of the rotor 14 can be increased accordingly. In addition, power can be enhanced without an increase in width of the first ribs 84, thereby reducing occurrence of a short circuit (leakage) of a magnetic flux between the first and second magnets 36 and 38 through the first ribs 84. As a result, it is possible to enhance power while reducing occurrence of a short circuit of a magnetic flux between adjacent ones of the first and second magnets 36 and 38.

In addition, since the first and second magnets 36 and 38 placed in the first through third housing holes 40, 42, and 44 have the same shape, the first and second magnets 36 and 38 can be shared to reduce the fabrication cost and enhance easiness in installing the magnets to the rotor 14, as compared to a case where the first and second magnets 36 and 38 have different shapes.

Further, in the second and third housing holes 42 and 44, the presence of the fourth cavity C4 formed by the sixth curved portion 92 and facing the upper surface and corners of the second magnet 38 at the outer peripheral side thereof can intentionally hinder a flow of a magnetic flux, which otherwise easily flows toward the outer periphery of the rotor 14, from the corner of the second magnet 38. Thus, the magnetic flux can uniformly flow outward to the second retainer 74 in the longitudinal direction of the second magnet 38, and thereby, demagnetization can be prevented.

Furthermore, since the fourth cavity C4 in each of the second and third housing holes 42 and 44 is connected to, and communicates with, the third cavity C3 located at the side of the second magnet 38 and at the outer peripheral side of the second or third housing hole 42 or 44, the third and fourth cavities C3 and C4 in the second and third housing holes 42 and 44 equipped with the second magnets 38 can be filled with a magnet fixing material at the same time. As a result, productivity can be enhanced.

In addition, the first ribs 84 are tilted relative to the first magnet 36 in the first housing hole 40 such that the first ribs 84 are approximately parallel with the side surfaces of the second magnets 38 placed in the second and third housing holes 42 and 44. Thus, as compared to a case where the first ribs 84 are approximately parallel with the side surface of the first magnet 36, the first ribs 84 can be located close to the second rib 88 at the outer peripheral sides of the second and third housing holes 42 and 44. In other words, the distance between the second rib 88 and the first ribs 84 can be reduced. As a result, the rigidity of the second rib 88 can be increased, thereby reducing generation of stress near the second rib 88 when a centrifugal force is applied under rotation of the rotor 14.

Since the area of the second cavity C2 in each of the second and third housing holes 42 and 44 is larger than that of the first cavity C1 of the first housing hole 40, the strength against application of a centrifugal force can be enhanced, and generation of stress can be reduced accordingly.

In addition, since the first and second curved portions 66 and 68 are provided in the first housing hole 40 at both longitudinal ends of the first ribs 84 and the third and fourth curved portions 80 and 82 are provided in the second and third housing holes 42 and 44, the length of the first ribs 84 can be made larger than that in a case where the first through fourth curved portions 66, 68, 80, and 82 are not provided. Thus, occurrence of a short circuit of a magnetic flux through the first ribs 84 can be prevented.

Further, the first through third housing holes 40, 42, and 44 can be formed concurrently with pressing of the steel plates constituting the rotor body 28, and can be easily formed even in the case of forming complicated shapes, such as the first through fourth spaces C1, C2, C3, and C4.

The rotary electric machine of the present application is not limited to the foregoing embodiment, and various changes and modifications may be made without departing from the general scope of the present application.

The present application describes a rotary electric machine includes: a stator configured to be equipped with a conductor; and a rotor disposed at a center of the stator so as to be rotatable and having slots in which three magnets corresponding to one pole are housed, wherein the slots have a first housing hole that is disposed near an outer periphery of the rotor and is approximately parallel with an outer peripheral surface of the rotor and a pair of second housing holes that are symmetric about the first housing hole and are tilted toward the outer periphery in directions away from the first housing hole, a pair of first ribs are disposed such that each of the pair of first ribs is located between the first housing hole and an associated one of the second housing holes, a pair of second ribs are disposed such that each of the pair of second ribs is located between an associated one of the second housing holes and the outer peripheral surface of the rotor, and an area of a first space between the magnet and the first rib in each of the first and second housing holes is larger than an area of a second space between the magnet and an adjacent one of the second ribs in each of the second housing holes.

In this configuration, for use as slots for housing magnets, the first housing hole approximately parallel with the outer peripheral surface of the rotor and the pair of second housing holes symmetric about the first housing hole and tilted toward the outer periphery in directions away from the first housing hole are provided near the outer periphery of the rotor constituting the rotary electric machine. The area of the first space between the first rib, which is located between the first and second housing holes, and the magnet is larger than the area of the second space between the second rib, which is located between the second housing hole and the outer peripheral surface of the rotor, and the magnet.

Thus, in the rotor in which three magnets are provided near the outer periphery, the magnets can be located near the outer periphery of the rotor in the second housing holes near the outer periphery, and thus, the magnets can approach the stator. Accordingly, a rotary output of the rotor can be increased. Since the increased rotary output eliminates the necessity for widening the first rib, occurrence of a short circuit (leakage) of a magnetic flux through the first rib between the magnet in the first housing hole and the magnet in the second housing hole can be reduced. As a result, the rotary electric machine can enhance power with reduced occurrence of a short circuit of a magnetic flux between adjacent magnets.

The magnet placed in the first housing hole and the magnets placed in the second housing holes may have an identical shape. This configuration can reduce the fabrication cost by sharing the magnets and enhance easiness in installing the magnets to the rotor, as compared to the case of using magnets with different shapes.

The second space may include a first subspace between a corner of the magnet at the outer periphery of the rotor and the second rib. This first subspace increases the distance between the corner and the second rib, thereby intentionally reducing a flow of a magnetic flux that otherwise easily flows from the corner closest to the outer periphery to the rotor. Accordingly, the magnetic flux is allowed to flow uniformly in the longitudinal direction of the magnet toward the outer periphery, resulting in prevention of demagnetization.

The second space preferably includes a second subspace between a side surface of the magnet and the second rib so that the second subspace is connected to, and communicates with, the first subspace. This configuration enables the magnets to be placed in the first and second space cavities at a time in filling the second housing holes with a magnet fixing material to fix the magnets, thereby enhancing productivity.

Each of the first ribs may be approximately parallel with a side surface of an adjacent one of the magnets placed in the second housing holes. In this configuration, the first rib can be located closer to the second rib than in a case where the first rib is approximately parallel with a side surface of the magnet in the first housing hole, and thus, the rigidity of the second rib can be increased. As a result, generation of stress caused by an application of a centrifugal force under rotation of the rotor can be further reduced.

The first space preferably includes a third subspace between the magnet placed in the first housing hole and an adjacent one of the first ribs, and a fourth subspace between each of the magnets placed in the second housing holes and an adjacent one of the first ribs, such that the fourth subspace is larger than the third subspace. This configuration can enhance the strength against a centrifugal force occurring when the rotor rotates, and accordingly, can reduce generation of stress.

Each of the first and second housing holes may have a recess facing both ends of an adjacent one of the first ribs and recessed in a longitudinal direction of the first rib. In this configuration, the longitudinal distance of the first rib can be longer than that in the case of providing no recess, thus further reducing occurrence of a short circuit of a magnetic flux.

The present application can provide the following advantages.

Specifically, for use as slots for housing magnets, the first housing hole approximately parallel with the outer peripheral surface of the rotor and the pair of second housing holes symmetric about the first housing hole and tilted toward the outer periphery in directions away from the first housing hole are provided near the outer periphery of the rotor constituting the rotary electric machine. The area of the first space between the first rib, which is located between the first and second housing holes, and the magnet is larger than the area of the second space between the second rib, which is located between the second housing hole and the outer peripheral surface of the rotor, and the magnet. With this configuration, the magnets can be located close to the outer periphery of the rotor in the second housing holes, and thereby, output power can be increased. In addition, since the first rib does not need to be widened, it is possible to reduce occurrence of a short circuit (leakage) of a magnetic flux between the magnet in the first housing hole and the magnet in each of the second housing holes.

Obviously, numerous modifications and variations of the present invention are possible in light of the above teachings. It is therefore to be understood that within the scope of the appended claims, the invention may be practiced otherwise than as specifically described herein.

What is claimed is:

1. A rotary electric machine comprising:
   a rotor having a rotational axis around which the rotor is to be rotated and comprising:
      poles having slots, respectively; and
      magnets provided in the slots, each of the slots comprising:
         a first housing hole disposed near an outer periphery of the rotor to be substantially parallel with an outer peripheral surface of the rotor;
         a pair of second housing holes provided symmetrically with respect to the first housing hole to be inclined toward the outer periphery away from the first housing hole;
         a pair of first ribs each provided between the first housing hole and each of the pair of second housing holes;
         a pair of second ribs each provided between each of the pair of second housing holes and the outer peripheral surface of the rotor; and
         an area of a first space between each of the magnets and the first rib in each of the first and second housing holes being larger than an area of a second space between each of the magnets and an adjacent one of the pair of second ribs in each of the pair of second housing holes; and
   a stator having a center axis and provided to surround the rotor such that the rotational axis of the rotor substantially coincides with the center axis of the stator, wherein
   the second space includes a first subspace between a corner of each of two magnets among the magnets at the outer periphery of the rotor and an adjacent one of the pair of second ribs, wherein
   the second space includes a second subspace between a first side surface of the each of two magnets among the magnets and an adjacent one of the pair of second ribs, and wherein
   the second subspace is connected to, and communicates with, the first subspace.

2. The rotary electric machine of claim 1, wherein
   one magnet among the magnets is placed in the first housing hole and the two magnets among the magnets are respectively placed in the pair of second housing holes have an identical shape.

3. The rotary electric machine of claim 1, wherein
   each of the pair of first ribs is approximately parallel with a second side surface of an adjacent one of the two magnets among the magnets respectively placed in the pair of second housing holes.

4. The rotary electric machine of claim 1, wherein
   the first space includes a third subspace between one magnet among the magnets placed in the first housing hole and an adjacent one of the pair of first ribs, and a fourth subspace between the each of two magnets among the magnets respectively placed in the second housing holes and an adjacent one of the pair of first ribs, and
   the fourth subspace is larger than the third subspace.

5. The rotary electric machine of claim 1, wherein
   each of the first and second housing holes has a recess facing both ends of an adjacent one of the pair of first ribs and recessed in a longitudinal direction of the one of the pair of first ribs.

6. The rotary electric machine of claim 1, wherein
   the first housing hole has inner walls both of which extend in a width direction of the first housing hole and each of which is tilted at a predetermined angle, and a width of the first housing hole gradually increases toward an inner periphery of the rotor.

7. The rotary electric machine of claim 6, wherein the first housing hole which has the inner walls is approximately fan shaped when viewed on a cross section taken along a plane perpendicular to the rotational axis.

8. A rotary electric machine comprising:
a rotor having a rotational axis around which the rotor is to be rotated and comprising:
    poles having slots, respectively; and
    magnets provided in the slots, each of the slots comprising:
        a first housing hole disposed near an outer periphery of the rotor to be substantially parallel with an outer peripheral surface of the rotor;
        a pair of second housing holes provided symmetrically with respect to the first housing hole to be inclined toward the outer periphery away from the first housing hole;
        a pair of first ribs each provided between the first housing hole and each of the pair of second housing holes;
        a pair of second ribs each provided between each of the pair of second housing holes and the outer peripheral surface of the rotor; and
        an area of a first space between each of the magnets and the first rib in each of the first and second housing holes being larger than an area of a second space between each of the magnets and an adjacent one of the pair of second ribs in each of the pair of second housing holes; and
a stator having a center axis and provided to surround the rotor such that the rotational axis of the rotor substantially coincides with the center axis of the stator, wherein
the first housing hole has inner walls both of which extend in a width direction of the first housing hole and each of which is tilted at a predetermined angle, and a width of the first housing hole gradually increases toward an inner periphery of the rotor.

9. The rotary electric machine of claim 8, wherein the first housing hole which has the inner walls is approximately fan shaped when viewed on a cross section taken along a plane perpendicular to the rotational axis.

\* \* \* \* \*